(12) United States Patent
Trail et al.

(10) Patent No.: US 10,416,766 B1
(45) Date of Patent: Sep. 17, 2019

(54) VARIFOCAL HEAD-MOUNTED DISPLAY INCLUDING MODULAR AIR SPACED OPTICAL ASSEMBLY

(71) Applicant: Facebook Technologies, LLC, Menlo Park, CA (US)

(72) Inventors: Nicholas Daniel Trail, Bothell, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/389,685

(22) Filed: Apr. 19, 2019

Related U.S. Application Data

(63) Continuation of application No. 15/407,701, filed on Jan. 17, 2017, now Pat. No. 10,310,598.

(51) Int. Cl.
*G09G 5/00* (2006.01)
*G06F 3/01* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC .......... G06F 1/163; G06F 3/011; G06F 3/013; G02B 7/28; G02B 7/287;
(Continued)

(56) References Cited

U.S. PATENT DOCUMENTS 5,768,443 A 6/1998 Michael et al.
2002/0143578 A1 10/2002 Cole et al.
(Continued)

FOREIGN PATENT DOCUMENTS

JP 3298081 B2 7/2002
JP 2014-219621 A 11/2014
(Continued)

OTHER PUBLICATIONS

European Extended Search Report, European Application No. 16161315.3, dated Aug. 2, 2016, 10 pages.
(Continued)

*Primary Examiner* — Stephen G Sherman
*Assistant Examiner* — Aaron Midkiff
(74) *Attorney, Agent, or Firm* — Fenwick & West LLP

(57) ABSTRACT

A head-mounted display (HMD) includes an electronic display configured to emit image light, an optical assembly that provides optical correction to the image light, an eye tracking system, and a varifocal module. The optical assembly includes a back optical element configured to receive the image light from the electronic display, and a coupling assembly configured to couple a front optical element to a location within the optical assembly such that the front optical element receives light transmitted by the back optical element. The optical correction is determined in part by an optical characteristic of the front optical element that is replaceable. The eye tracking system determines eye tracking information for a first eye of a user of the HMD. A varifocal module adjusts focus of images displayed on the electronic display, based on the eye tracking information and the optical correction.

20 Claims, 4 Drawing Sheets

(51) Int. Cl.
*G06F 1/16* (2006.01)
*G02B 27/00* (2006.01)
*G02B 27/01* (2006.01)
*G02C 7/08* (2006.01)

(52) U.S. Cl.
CPC .............. *G06F 1/163* (2013.01); *G06F 3/011* (2013.01); *G02B 2027/014* (2013.01); *G02B 2027/0138* (2013.01); *G02B 2027/0185* (2013.01); *G02C 7/081* (2013.01)

(58) Field of Classification Search
CPC ..... G02B 27/00–648; G02B 2027/0105–0198; G02C 7/081
USPC ....................... 345/8, 156; 382/103; 359/630
See application file for complete search history.

(56) References Cited

U.S. PATENT DOCUMENTS

| | | |
|---|---|---|
| 2003/0113727 A1 | 6/2003 | Girn et al. |
| 2006/0210111 A1 | 9/2006 | Cleveland et al. |
| 2007/0183293 A1 | 8/2007 | Murata et al. |
| 2008/0027656 A1 | 1/2008 | Parida |
| 2008/0154566 A1 | 6/2008 | Myres et al. |
| 2008/0255768 A1 | 10/2008 | Martin et al. |
| 2009/0189974 A1* | 7/2009 | Deering ................... G09G 3/02 348/46 |
| 2010/0079356 A1* | 4/2010 | Hoellwarth .......... G02B 27/017 345/8 |
| 2010/0141852 A1 | 6/2010 | Jurik et al. |
| 2010/0177163 A1 | 7/2010 | Yang et al. |
| 2012/0218172 A1* | 8/2012 | Border ............... G02B 27/0093 345/8 |
| 2013/0050070 A1 | 2/2013 | Lewis et al. |
| 2013/0077049 A1 | 3/2013 | Bohn |
| 2013/0085728 A1 | 4/2013 | Tang et al. |
| 2013/0176533 A1 | 7/2013 | Raffle et al. |
| 2013/0206967 A1* | 8/2013 | Shpunt .................... G06T 15/00 250/216 |
| 2014/0085452 A1* | 3/2014 | Nistico ................ A61B 3/0008 348/78 |
| 2014/0092139 A1 | 4/2014 | Sullivan et al. |
| 2014/0153102 A1 | 6/2014 | Chang |
| 2014/0177063 A1 | 6/2014 | Wang et al. |
| 2014/0211193 A1 | 7/2014 | Bloom et al. |
| 2014/0278138 A1 | 9/2014 | Barber et al. |
| 2014/0368793 A1 | 12/2014 | Friedman et al. |
| 2015/0035744 A1* | 2/2015 | Robbins ............... G02B 27/017 345/156 |
| 2015/0062558 A1 | 3/2015 | Koppal et al. |
| 2015/0102981 A1 | 4/2015 | Lee et al. |
| 2015/0181096 A1 | 6/2015 | Kasai et al. |
| 2015/0212326 A1 | 7/2015 | Kress et al. |
| 2015/0346495 A1* | 12/2015 | Welch ................. G02B 27/0172 345/8 |
| 2016/0091720 A1* | 3/2016 | Stafford ............. G02B 27/0172 345/8 |
| 2016/0240013 A1* | 8/2016 | Spitzer ..................... G06F 3/013 |
| 2017/0140224 A1* | 5/2017 | Wilson ............... G02B 27/0093 |
| 2017/0343822 A1* | 11/2017 | Border ............... G02B 27/0172 |

FOREIGN PATENT DOCUMENTS

| | | |
|---|---|---|
| KR | 10-2013-0011692 A | 1/2013 |
| KR | 10-2014-0144510 A | 12/2014 |
| WO | WO 2015/18441 A1 | 12/2015 |

OTHER PUBLICATIONS

Machine translated JP2014-219521; Date of publication: Nov. 20, 2014.
PCT International Search Report and Written Opinion, PCT Application No. PCT/US2016/017397, dated Aug. 16, 2016, 21 pages.
PCT International Search Report and Written Opinion, PCT Application No. PCT/US2016/059938, dated Dec. 20, 2016, 12 paQes.
PCT International Search Report and Written Opinion, PCT Application No. PCT/US2017/012346, dated Mar. 30, 2017, 13 oaaes.
Robinett, W., "Computational Model for the Stereoscopic Optics of a Head-Mounted Display," Proceedings of SPIE Stereoscopic Displays and Applications II, Jan. 1991, DD. 140-160, vol. 1457.
State, A. et al., "Dynamic Virtual Convergence for Video See-Through Head- Mounted Displays: Maintaining Maximum Stereo Overlap Throughout a Close-Range Work Space," IEEE and ACM International Symposium on New Augmented Reality, Oct. 29-30, 2001, DD. 137-146.
U.S. Appl. No. 14/963,109, filed Dec. 8, 2015, Inventors Douglas Robert Lanman et al.
U.S. Appl. No. 14/963,126, filed Dec. 8, 2015, Inventors Douglas Robert Lanman et al.
U.S. Appl. No. 15/366,412, filed Dec. 1, 2016, Inventor Nicholas Daniel Trail.
United States Office Action, U.S. Appl. No. 15/366,412, dated Nov. 15, 2018, fifty pages.

* cited by examiner

VARIFOCAL HEAD-MOUNTED DISPLAY INCLUDING MODULAR AIR SPACED OPTICAL ASSEMBLY

CROSS REFERENCE TO RELATED APPLICATIONS

This application is a continuation of co-pending U.S. application Ser. No. 15/407,701, filed Jan. 17, 2017, which is incorporated by reference in its entirety.

BACKGROUND

The present disclosure generally relates to varying focus and prescription correction in virtual and augmented reality systems, and specifically relates to a varifocal system within a head-mounted display (HMD) that includes a modular air spaced optical assembly.

Head-mounted displays (HMDs) typically are setup for uncorrected vision, and then require the end-user to wear contacts, or if small/viable enough, wear their prescription correction glasses within the HMD. Given the distribution of possible optical errors (primarily decomposed into spherical and astigmatism), there is a very large number of combinations present and a significant user-base that is not able to adequately wear their glasses. In addition, wearing unknown prescription or adding third-party optical elements introduces unknown optical elements and therefore distortion and focal cues into HMD based systems. This can cause the wrong distortion parameters, focus errors, reflections/scatter if an eye tracker is present in an HMD system, or general issues related to human factors, such as issues with comfort, weight, fit, etc.

One approach to solve the aforementioned problems is to allow a user wearing the HMD to swap or add optical elements to the HMD system that can correct for a user's optical prescription. However, given that optical prescriptions are usually specified in quarter-diopter ranges for power and astigmatism (which also includes rotation angle), there are literally thousands of combinations for correcting a user's optical prescription, which can make the logistics approach in HMD systems vary challenging. Furthermore, an approach based on applying calibration in HMD systems with third-party prescription optics, in order to remove distortion induced artifacts or eye tracking issues, is typically not accurate and efficient. Thus, it is desirable to efficiently implement optical prescription correction into HMD systems.

SUMMARY

Embodiments of the present disclosure support a head-mounted display (HMD). The HMD may be, e.g., a virtual reality (VR) system, an augmented reality (AR) system, a mixed reality (MR) system, or some combination thereof. The HMD includes an electronic display configured to emit image light, an optical assembly that provides optical correction to the image light, an eye tracking system, and a varifocal module. The optical assembly includes a back optical element and a coupling assembly. The back optical element is configured to receive the image light from the electronic display. The coupling assembly is configured to couple a front optical element to a location within the optical assembly such that the front optical element receives light transmitted by the back optical element, and that there is an air gap between the location and the back optical element. The optical correction of the HMD is determined in part by an optical characteristic of at least one of the front optical element and the back optical element. The eye tracking system determines eye tracking information for a first eye of a user of the HMD. The varifocal module is configured to adjust focus of one or more images displayed on the electronic display, based on the eye tracking information and the optical correction. The varifocal module adjusts focus of the one or more images displayed on the electronic display by adjusting a focal distance of the optical assembly based on the determined eye tracking information and the optical correction. The focal distance of the optical assembly can be adjusted by moving the electronic display and/or optical elements along an optical axis of the optical assembly, which also mitigates vergence-accommodation conflict of image light propagating towards a user's eye.

Figure 1:
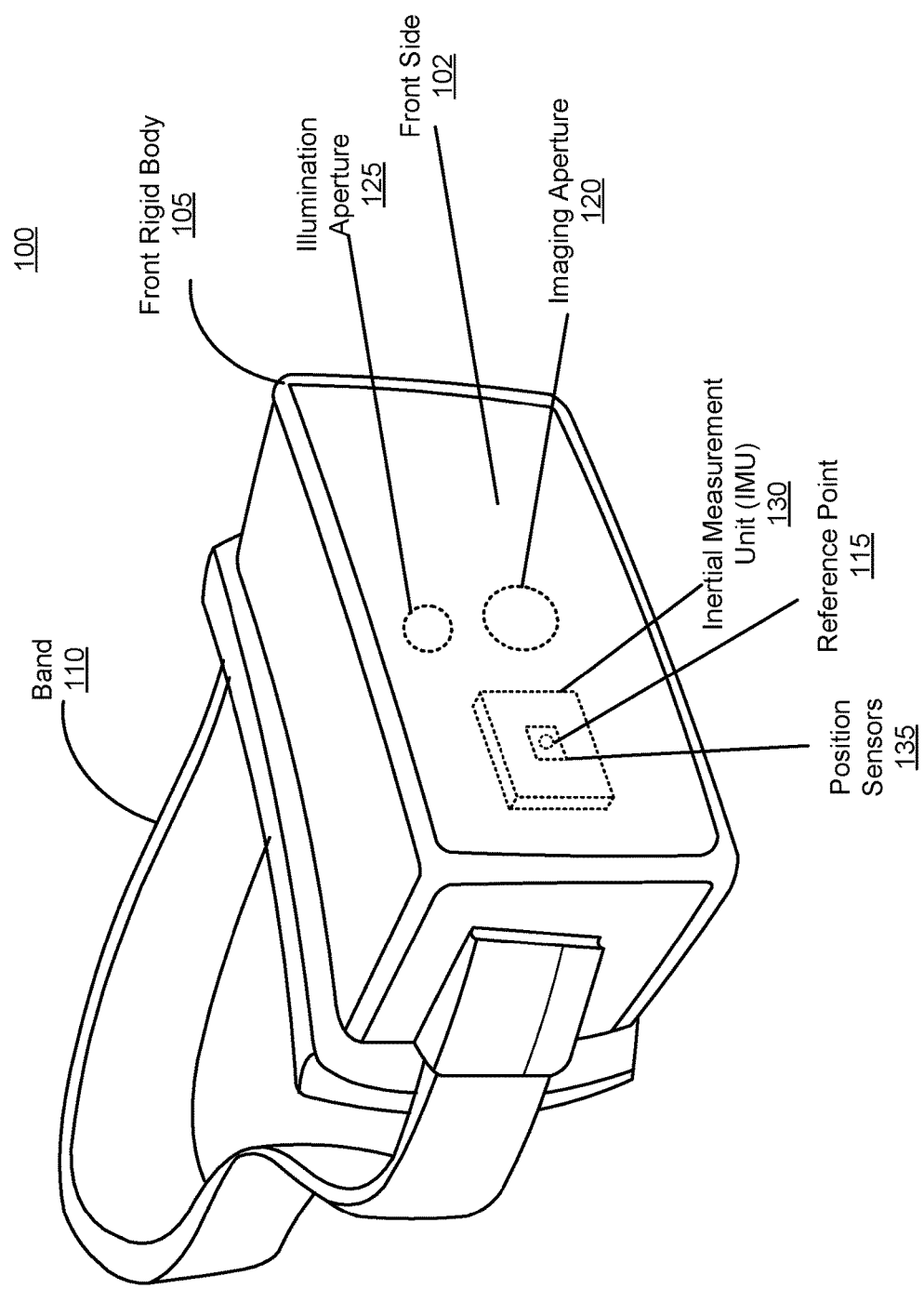
FIG. 1 is a diagram of a head-mounted display (HMD), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments include a varifocal system integrated into a head-mounted display (HMD), which is able to dynamically vary its focus in order to bring into focus images presented to a user wearing the HMD. The HMD may be part of, e.g., a virtual reality (VR) system, an augmented reality (AR) system, a mixed reality (MR) system, or some combination thereof. The varifocal system uses an eye tracking system integrated into the HMD to determine where the user is looking (i.e., user's eye-gaze location), and adjusts the focus to ensure that a displayed image is in focus at the determined eye-gaze location. The HMD includes a modular optical assembly comprising two or more optical elements (e.g., lenses or groups of lenses) and an electronic display. The modular optical assembly includes a front optical element closest to the user that is placed in optical series with a back optical element closest to the electronic display, with an air gap between the front optical element and the back optical element. The modular optical assembly is configured such that the front optical element can be switched out/replaced (e.g., by the user) with a different optical element, from a set of optical elements that each have, e.g., a different optical power or some other optical characteristic. The varifocal functionality of the HMD allows the system to fine tune the focus and residual correction of the users prescription/needs, such that the HMD outputs light to the user in a manner that is customized to an optical prescription of the user. Thus, for example, a user who is normally nearsighted is able to wear the HMD without glasses and see presented content clearly. Furthermore, the modular optical assembly can be configured such the front optical element is rotatable to align the front optical element within the optical assembly to compensate for astigmatism.

An approach for integrating the eye tracking system into the HMD is based herein on leveraging a doublet grouped optical design of the modular optical assembly that includes the front optical element and the back optical element. The back optical element includes a first surface closest to the electronic display and a second surface opposite to the first surface. In some embodiment, the second surface is coated (e.g., with a metal or dichroic coating) to reflect infrared (IR) light associated with an eye tracking path and transmit visible light associated with a display path. In one or more embodiments, the second coated surface of the back optical element is spherical and/or symmetrical, which facilitate the coating process.

In some embodiments, the eye tracking system is optically folded into the air gap of the modular optical assembly between the front optical element and the back optical element, outside of a transmitted display path (i.e., line of sight) of a user wearing the HMD. The eye tracking system includes an illumination source (e.g., infrared (IR) source) and an imaging device (e.g., IR camera). The illumination source is oriented to illuminate the coated second surface of the back optical element such that IR light emitted from the illumination source is reflected from the coated second surface towards an eye of the user. The imaging device is oriented to capture an image of the user's eye illuminated with the IR light reflected from the coated second surface of the back optical element. A controller coupled to the imaging device determines eye tracking information associated with the user's eye based on the captured image. The HMD can adjust resolution and/or focus of images displayed on the electronic display, based at least in part on the determined eye tracking information. In some embodiments, the electronic display and/or optical elements in the optical assembly can move to dynamically vary focus of the images displayed on the electronic display, as disclosed in more detail bellow in conjunction with FIG. 2.

In some embodiments, symmetrical surfaces of the back optical element in the optical assembly may facilitate more variables for a display path of image light output from the electronic display towards the user's eye, and fold an eye tracking path of the IR light to the user's eye-box location, with an offset in an incidence angle less than a wide field of view conventionally found in HMD-based systems. An eye-box represents a three-dimensional (3D) volume at an output of a HMD in which the user's eye is located to receive image light. If the eye tracking system was not folded between the front optical element and the back optical element of the optical assembly, the implemented eye tracking system would be too large to allow practical application due to potential distortion or un-viewable regions of the user's eye-box. In addition, the symmetry of the optical coated surface of the back optical element that acts as an IR reflector allows for buried (i.e., outside of a transmitted optical path of the HMD—and a user's line of sight) illumination sources (e.g., lasers, structured light (SL) systems, or light emitting diodes (LEDs)) to also bounce off of the coated surface and be folded into the eye-box. This presents for potentially smaller incidence angles as well and provides another means to facilitate glint or diffuse eye tracking, solely or in conjunction with 'external' illumination sources.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of the HMD 100 that are between a front side 102 of the HMD 100 and an eye of the user are at least partially transparent (e.g., a partially transparent electronic display). The HMD 100 includes a front rigid body 105, a band 110, and a reference point 115. In some embodiments, the HMD 100 shown in FIG. 1 also includes an embodiment of a depth camera assembly (DCA) and depicts an imaging aperture 120 and an illumination aperture 125. Some embodiments of the DCA include an imaging device, and an illumination source. The illumination source emits light through the illumination aperture 125. The imaging device captures light from the illumination source and ambient light in the local area through the imaging aperture 120. In some embodiment, light emitted from an illumination source through the illumination aperture 125 comprises a structured light pattern.

In one embodiment, the front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
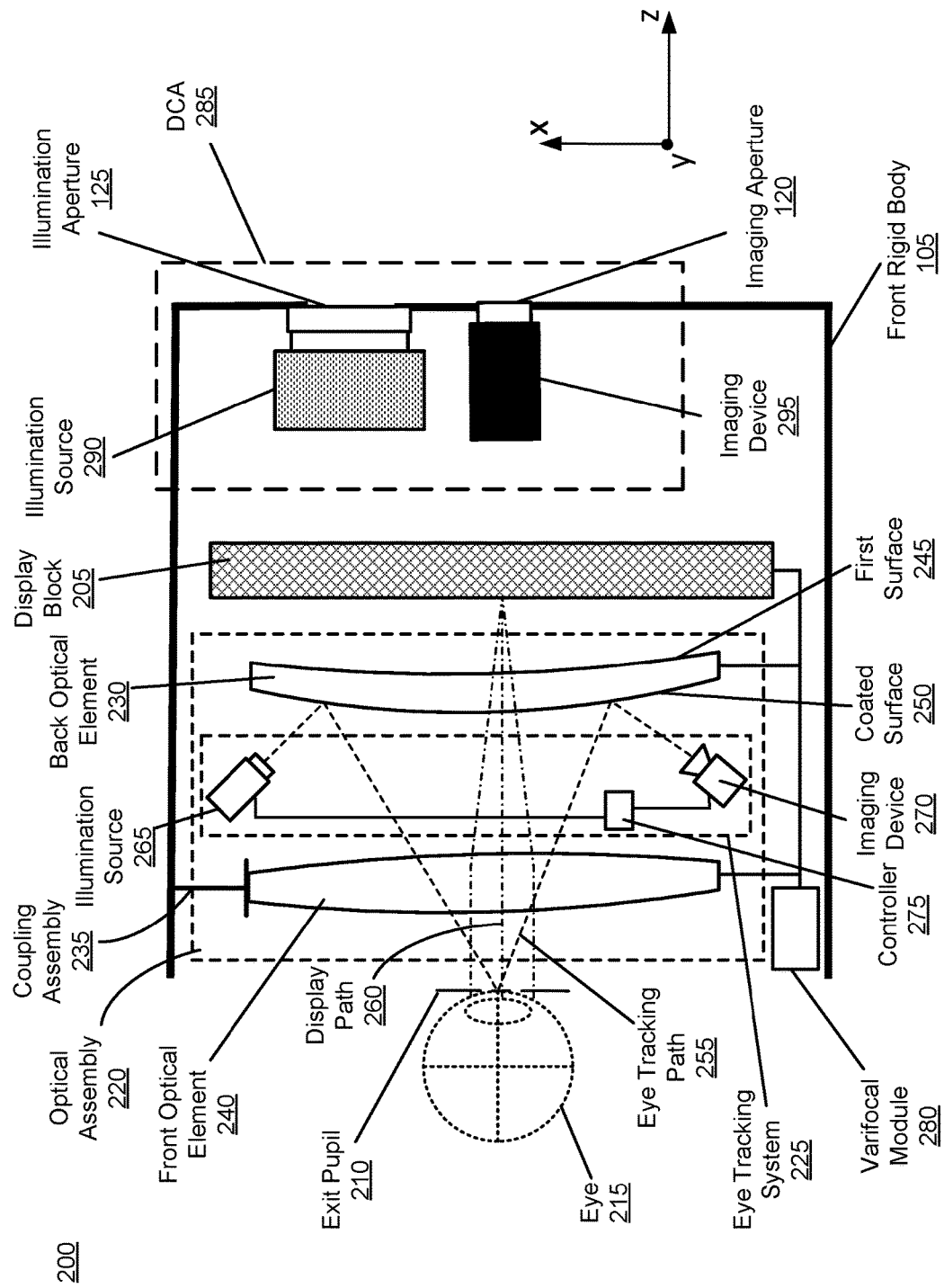
FIG. 2 is a cross section of a front rigid body of the HMD in FIG. 1, in accordance with an embodiment.

FIG. 2 is a cross section 200 of a front rigid body 105 of the embodiment of the HMD 100 shown in FIG. 1. As shown in FIG. 2, the front rigid body 105 includes a display block 205 with at least one electronic display that provides focus adjusted image light to an exit pupil 210. The exit pupil 210 is the location of the front rigid body 105 where a user's eye 215 is positioned. For purposes of illustration, FIG. 2 shows a cross section 200 associated with a single eye 215, but another display block, separate from the display block 205, provides altered image light to another eye of the user.

The display block 205 generates image light. In some embodiments, the display block 205 includes an optical element that adjusts the focus of the generated image light. The display block 205 displays images to the user in accordance with data received from a console (not shown in FIG. 2). In various embodiments, the display block 205 may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The display block 205 may also include an aperture, a Fresnel lens, a convex lens, a concave lens, a diffractive element, a waveguide, a filter, a polarizer, a diffuser, a fiber taper, or any other suitable optical element that affects the image light emitted from the electronic display. In some embodiments, one or more of the display block optical elements may have one or more coatings, such as anti-reflective coatings.

An optical assembly 220 magnifies received light from the display block 205, corrects optical aberrations associated with the image light, and the corrected image light is presented to a user of the HMD. At least one optical element of the optical assembly 220 may be an aperture, a Fresnel lens, a refractive lens, a reflective surface, a diffractive element, a waveguide, a filter, or any other suitable optical element that affects the image light emitted from the display block 205. Moreover, as discussed in more detail below, the optical assembly 220 may be modular and include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the display block 205 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly 220 is designed so its effective focal length is larger than the spacing to the display block 205, which magnifies the image light projected by the display block 205. Additionally, in some embodiments, the amount of magnification may be adjusted by adding or removing optical elements. In some embodiments, the optical assembly 220 is telecentric or nearly telecentric. Note that the optical assembly 220 is telecentric or nearly telecentric when the chief ray angle across the field angles is close to being normal to the display block 205. Given that most display technologies are Lambertian in nature, a telecentric optical assembly 220 then provides improved uniformity of illumination to the eye 215 with image light output from the display block 205. In addition, a telecentric or nearly telecentric optical assembly 220 is less sensitive to distortion mapping offsets, which can be dynamic in nature when implementing the varifocal functionality into the optical assembly 220.

In some embodiments, as discussed in more detail below, the front rigid body 105 of the HMD 100 further includes an eye tracking system 225, which may be integrated into the optical assembly 220 for determining and tracking a position and orientation of the user's eye 215 in an eye-box. Based on the determined and tracked position and orientation of the user's eye 215, i.e., an angle of eye-gaze and eye-gaze location, the HMD 100 may adjust presentation of an image displayed on the electronic display of the display block 205. In an embodiment, the HMD 100 may adjust resolution of a displayed image. A maximum pixel density for displaying an image on the electronic display of the display block 205 can be provided only in a foveal region of the determined eye-gaze, whereas a lower resolution display is employed in other regions, without negatively affecting the user's visual experience. Furthermore, as discussed in more detail below, the HMD 100 may adjust focus of a displayed image such that the displayed image is in focus at the determined eye-gaze location.

In some embodiments, the optical assembly 220 provides optical correction to the image light emitted from the electronic display of the display block 205. The optical assembly 220 comprises a back optical element 230 configured to receive the image light from the electronic display of the display block 205. The optical assembly 220 further comprises a coupling assembly 235 configured to couple a front optical element 240 to a location within the optical assembly 220 such that the front optical element 240 receives light transmitted by the back optical element 230, and that there is an air gap between the location where the front optical element 240 can be coupled and the back optical element 230. The optical correction provided by the optical assembly 220 is determined in part by an optical characteristic of at least one of the front optical element 240 and the back optical element 230. In some embodiments, the optical assembly 220 further comprises at least one other optical element positioned in optical series with the front optical element 240 and the back optical element 230. In some embodiments, the front optical element 240 comprises two or more lenses, and the back optical element 230 comprises a single lens. In alternate embodiments, the front optical element 240 and the back optical element 230 each comprise a group of two or more lenses.

In some embodiments, the back optical element 230 comprises a first surface 245 adjacent to the display block 205 and a surface 250 opposite to the first surface 245. The surface 250 can be configured such that to reflect light of a defined range of wavelengths. In some embodiments, the surface 250 is coated with a metallic or dichroic coating to reflect light of the defined range of wavelengths for an eye tracking path 255 and transmit light of a visible spectrum for a primary display optical path 260 of image lights emitted from the display block 205 towards the user's eye 215. In one or more embodiments, the defined range of wavelengths comprises wavelengths larger than 750 nm, i.e., the surface 250 can be coated to reflect IR light and transmit visible light. In an embodiment, the surface 250 is symmetrical and spherical, which facilitates the dichroic coating process. In alternate embodiments, the surface 250 is aspherical, consisting of other polynomial basis, or of a free-form, and the surface 250 may still be symmetrical.

In one or more embodiments, a Fresnel lens can be positioned on the first surface 245 of the back optical element 230 in the primary display optical path 260. For example, the first surface 245 of the back optical element 230 can be a Fresnel surface that provides for further degrees of freedom to help correct aberrations when outputting image light from the electronic display of the display block 205 towards the user's eye 215. In addition, having the Fresnel lens as far away from the eye 215 as practical helps to limit the collected solid angle of the eye 215 to the scattered light that ultimately comes from the Fresnel non-monolithic structure. In one embodiment, the first surface 245 of the back optical element 230 comprises a Fresnel surface. In this case, the optical assembly 220 does not comprise any other Fresnel surface or a Fresnel lens. In some embodiments, the front optical element 240 and the back optical element 230 can be made out of different materials. For example, the front optical element 240 may be made out of materials that are harder to scratch. Also, the back optical element 230 may be environmentally sealed in order to prevent dust/dirt/moisture from getting behind the back optical element 230.

The front optical element 240 of the optical assembly 220 is configured as replaceable. For example, to compensate for a user's optical prescription when performing optical correction of the image light, a user can remove the front optical element 240 and replace the front optical element 240 with another optical element of a different optical power than that of the front optical element 240. In this case, the front optical element 240 can be also configured to provide a prescription and distortion update utilized by the eye tracking system for determining eye tracking information, as an optical power of the front optical element 240 affects the eye tracking path 255. For example, once the user replaces the front optical element 240 to account for his/her prescription, the system can either manually (with user input) or automatically register the new front optical element 240, to look-up its optical properties and corrections for the distortion mapping across the eye-box. At this point, the system can also prompt the user to remove the residual prescription error with feedback from how much more diopters to remove by activating the varifocal feature of the display block 205. The optical correction to the image light provided by the optical assembly 220 can be achieved based at least in part on changing an optical characteristic of the front optical element 240. An optical characteristic of an optical element presented herein (e.g., the front optical element 240) may relate to at least a spherical optical power and a nominal magnitude for correcting astigmatism. In some embodiments, the front optical element 240 can be selected from a set of optical elements, wherein each optical element from the set has a different optical characteristic. For example, each optical element in the set has a different spherical optical power. In an illustrative embodiment, the set of optical elements comprises spherical lenses with spherical optical powers of −6, −3, 0, and +3 diopters, and other lenses with the same spherical optical powers having additional diopters for astigmatism.

In some embodiments, the front optical element 240 can be configured as rotatable to align the front optical element 240 within the optical assembly 220 to compensate for astigmatism. In an embodiment, a user wearing the HMD 100 can manually rotate a portion of the front optical element 240 or the entire front optical element 240 by a specific angle to change the optical characteristic of the front optical element 240 and provide optical correction to the image light to correct for astigmatism. In another embodiment, rotation of the front optical element 240 by a specific angle can be set during manufacturing in order to align the front optical element 240 within the optical assembly 220 to compensate for pre-determined astigmatism. To provide propagation of the eye tracking path 255 and the display paths illustrated in FIG. 2, the front optical element 240 is configured to transmit both IR light and visible light. In an embodiment, the optical assembly 220 provides optical correction to the image light based on including an additional optical element in front of the back optical element 230, i.e., in an air gap between the front optical element 240 and the back optical element 230.

In some embodiments, the eye tracking system 225 is integrated within the optical assembly 220 in an air gap between the front optical element 240 and the back optical element 230. As shown in FIG. 2, the eye-tracking system 225 includes an illumination source 265, an imaging device 270, and a controller 275 that may be coupled to both the illumination source 265 and the imaging device 270. The controller 275 is configured to determine a position and orientation of at least a single eye 215. In an alternate embodiment, the controller 275 is part of the imaging device 270. In alternate embodiments, multiple illumination sources or multiple imaging devices may be employed for a single eye. Similarly, for each of the user's eyes, a corresponding illumination source and imaging device may be employed. The components of the eye tracking system 225 are hidden from the user's sight because the illumination source 265, the imaging device 270 and the controller 275 are positioned outside the primary display optical path 260 to the user's eye 215.

The illumination source 265 is positioned optically between the front optical element 240 and the back optical element 230 such that to illuminate the coated surface 250 of the back optical element 230 with light having one or more wavelengths within the defined range of wavelengths. The light (e.g., IR light) emitted from the illumination source 265 is reflected from the coated surface 250 towards the user's eye 215, i.e., the light emitted from the illumination source 265 is propagated along the eye tracking path 255 to a surface of the user's eye 215.

In one embodiment, the illumination source 265 comprises a plurality of emitters that emit IR light. The plurality of emitters of the illumination source 265 may be implemented on a single substrate. In an alternative embodiment, the illumination source 265 may comprise a single emitter of IR light. In yet another embodiment, the illumination source 265 is configured to emit a structured light to illuminate the coated surface 250 of the back optical element 230, wherein the structured light features one or more wavelengths within the defined range of wavelengths to be reflected from the coated surface 250 towards an eye-box of the user's eye 215. In some embodiments, the controller 275 coupled to the illumination source 265 controls operations of one or more light emitters in the illumination source 265. In one embodiment, the controller 275 modulates light emitted from the illumination source 265. In another embodiment, the controller 275 controls one or more wavelengths of light emitted from the illumination source 265. In one or more embodiments, the light emitted from the illumination source 265 and reflected from the coated surface 250 comprises light having at least one of a wavelength of 850 nm or a wavelength of 940 nm, which is not visible to the user's eye 215. In general, the light emitted from the illumination source 265 and reflected from the coated surface 250 comprises light having one or more wavelengths larger than 750 nm. In one embodiment, a length of the eye-box of the user's eye 215 that is covered by positioning of the illumination source and the imaging device 270 between the front optical element 240 and the back optical element 230 can be approximately 20 mm.

In some embodiments, the imaging device 270 is positioned optically between the front optical element 240 and the back optical element 230 such that the imaging device 270 captures an image of the eye 215 illuminated with light that propagates along the eye tracking path 255. Thus, the imaging device 270 captures light reflected from a surface of the eye 215 that was emitted from the illumination source 265 and reflected from the coated surface 250. In one or more embodiments, the imaging device 270 comprises a camera configured to capture images in the IR. As illustrated in FIG. 2, the light that propagates along the eye-tracking path 255 that was reflected from a surface of the user's eye 215 may be further reflected from the coated surface 250 before being captured by the imaging device 270. In this way, a wide field of view of the user's eye 215 can be captured, e.g., the field of view of the full eye-box of the eye 215 and even significantly more can be covered by appropriate positioning of the illumination source 265 and the imaging device 270.

The controller 275 that may be coupled to both the illumination source 265 and the imaging device 270 is configured to determine eye tracking information associated with the user's eye 215 based on the light reflected from a surface of the user's eye 215 and captured by the imaging device 270, i.e., based on the light propagating along the eye tracking path 255 captured by a detector (not shown in FIG. 2) of the imaging device 270. In one or more embodiments, the eye tracking information determined by the controller 275 may comprise information about a position and orientation of the eye 215, i.e., an angle of eye-gaze and eye-gaze location.

In some embodiments, the HMD 100 in FIG. 1 can adjust presentation of one or more images (e.g., two dimensional (2D) or 3D images) displayed on the electronic display of the display block 205, based on the determined eye tracking information and the optical correction provided by the optical assembly 220. In one embodiment, the controller 275 is configured to adjust resolution of the displayed images, based at least in part on the determined eye tracking information. For example, the controller 275 can instruct a console (not shown in FIG. 2) to perform foveated rendering of the displayed images, based on the determined position and orientation of the user's eye 215. In this case, the console may provide a maximum pixel density for the display block 205 only in a foveal region of the user's eye-gaze, while a lower pixel resolution for the display block 205 can be used in other regions of the electronic display of the display block 205.

In some embodiments, a varifocal module 280 is configured to adjust focus and/or resolution of images displayed on the electronic display of the display block 205, based on the determined eye tracking information obtained from the controller 275 and the optical correction provided to the image light by the optical assembly 220. Thus, the varifocal module 280 may be interfaced (not shown in FIG. 2) with the controller 275. The varifocal module 280 is configured to at least in part compensate for a difference between an optical prescription of a user and the optical characteristic of at least one of the front optical element 240 and the back optical element 230 to provide the optical correction to the image light emitted from the display block 205 through the back optical element 230 and the front optical element 240 to the user's eye 215. A user can select the front optical element 240 having an optical characteristic that is closest to a user's optical prescription, including a spherical optical power and astigmatism correction (e.g., through factory or manual rotation of the front optical element 240). Then, the varifocal module 280 can compensate for the remaining error between the optical characteristic of the front optical element 240 and the user's optical prescription.

In some embodiments, at least one of the display block 205, the front optical element 240 and the back optical element 230 can be configured to be movable to dynamically vary focus of the images displayed on the electronic display of the display block 205. For example, the display block 205, the front optical element 240, and the back optical element 230 can be configured to be movable along z axis of a coordinate system shown in FIG. 2, i.e., along an optical axis of the optical assembly 220. In this case, the varifocal module 280 can be mechanically coupled with at least one of the display block 205, the front optical element 240 and the back optical element 230. In an embodiment, the varifocal module 280 is coupled to a motor (not shown in FIG. 2) that can move at least one of the display block 205, the back optical element 230 and the front optical element 240, e.g., along the z axis. Then, the varifocal module 280 can adjust focus of the displayed images by instructing the motor to adjust position of at least one of the display block 205, the front optical element 240 and the back optical element 230, based on the determined eye tracking information obtained from the controller 275 and the optical correction. Thus, a distance between the front optical element 240 and the back optical element 230 along the optical axis of the optical assembly 220 can be variable and controlled by the varifocal module 280. Similarly, a distance between the back optical element 230 and the display block 205 along the optical axis can be also variable and controlled by the varifocal module 280. By adjusting position of the at least one of the display block 205, the front optical element 240 and the back optical element 230 along the optical axis, the varifocal module 280 varies focus of image light output from the display block 205 towards the user's eye 215 to ensure that a displayed image is in focus at the determined location of user's eye-gaze. In addition, the varifocal module 280 compensates for a remaining error between an optical characteristic of the optical assembly 220 and a user's optical prescription, so that the display block 205 outputs image light to the user's eye 215 in a manner that is customized to a specific user's optical prescription. Furthermore, by adjusting focus of the image light, the varifocal module 280 can also mitigate vergence-accommodation conflict (VAC) of the image light. In this case, the varifocal module 280 is configured to adjust a position of the display block 205 to present proper vergence/accommodation cues when, for example, virtual/augmented scenes are closer in presentation. Additional details regarding HMDs with varifocal capability are discussed in U.S. application Ser. No. 14/963,126, filed Dec. 8, 2015, and is herein incorporated by reference in its entirety.

In an illustrative embodiment, an optical prescription of a user wearing the HMD 100 is −2.25 diopters of spherical power and 0.25 diopters astigmatism at 45 degrees. The user can select the front optical element 240 having −3 diopters of spherical power (no astigmatism). In this configuration, the front optical element 240 could be rotated by 45 degrees, either manually by the user during installation of the front optical element 240 or during manufacturing of the optical assembly 220, to help remove the residual astigmatism error. Alternatively, the user may not correct for the residual astigmatism error. In some embodiments, the user may be prompted to enter his/her optical prescription. Then, the varifocal module 280 can compensate for a difference between the user's optical prescription and an optical characteristic of at least one of the front optical element 240 and the back optical element 230. In the illustrative embodiment, once the user enters his/her optical prescription, the varifocal module 280 instructs a motor (not shown in FIG. 2) to move the electronic display of the display block 205 by approximately 1.0 mm to compensate for the excess of 0.75 diopters of remaining power error, as an example of linear distance to diopter scaling for a potential HMD. If the prescription of the user is too much for the varifocal module 280 to compensate for given the current front optical element 240, the controller 275 coupled to the varifocal module 280 or the varifocal module 280 itself can prompt the user to replace the front optical element 240 with one that would work. In an embodiment, the varifocal module 280 or the controller 275 may suggest to the user a correct front optical element, i.e., the front optical element 240 with a most appropriate optical characteristic. For example, if the optical prescription of the user is −4.75 diopters of spherical power (no astigmatism) and the user initially selects the front optical element 240 of −3 diopters of spherical power, the varifocal module 280 needs to move the electronic display of the display block 205 by approximately 2.33 mm to compensate for the excess of 1.75 diopters of remaining power error, which may be larger than a predetermined threshold distance. In this case, the varifocal module 280 or the controller 275 can be configured to prompt the user to select the front optical element 240 of −6 diopters of spherical power. Then, the varifocal module 280 is configured to move the electronic display of the display block 205 by approximately 1.67 mm (which is less than the predetermined threshold distance) to compensate for the excess of 1.25 diopters of remaining power error.

In some embodiments, the varifocal module 280 may be also configured to adjust resolution of the images displayed on the electronic display of the display block 205 by performing the foveated rendering of the displayed images, based at least in part on the determined eye tracking information received from the controller 275. In this case, the varifocal module 280 is electrically coupled to the display block 205 and provides image signals associated with the foveated rendering to the display block 205. The varifocal module 280 may provide a maximum pixel density for the display block 205 only in a foveal region of the user's eye-gaze, while a lower pixel resolution for the display block 205 can be used in other regions of the electronic display of the display block 205. In alternative configurations, different and/or additional components may be included in the front rigid body 105, which may be configured to adjust presentation of one or more images displayed on the electronic display of the display block 205, based on the determined eye tracking information and the optical correction provided by the optical assembly 220.

As shown in FIG. 2, the front rigid body 105 further includes a DCA 285 for determining depth information of one or more objects in a local area surrounding some or all of the HMD 100. The DCA 285 includes an illumination source 290, an imaging device (camera) 295, and a controller (not shown in FIG. 2) that may be coupled to both the illumination source 290 and the imaging device 295. The illumination source 290 emits light (e.g., structured light) through the illumination aperture 125. The illumination source 290 may be composed of a plurality of laser-type light emitters on a single substrate configured to simultaneously or in different time instants (e.g., controlled by the controller) emit a plurality of light beams, e.g., in the form of a structured light pattern. The imaging device 295 captures light from the illumination source 290 that is reflected/scattered from the local area through the imaging aperture 120. The controller of the DCA 285 may be configured to determine depth information of the one or more objects in the local area based on the captured reflected/scattered light.

Figure 3:
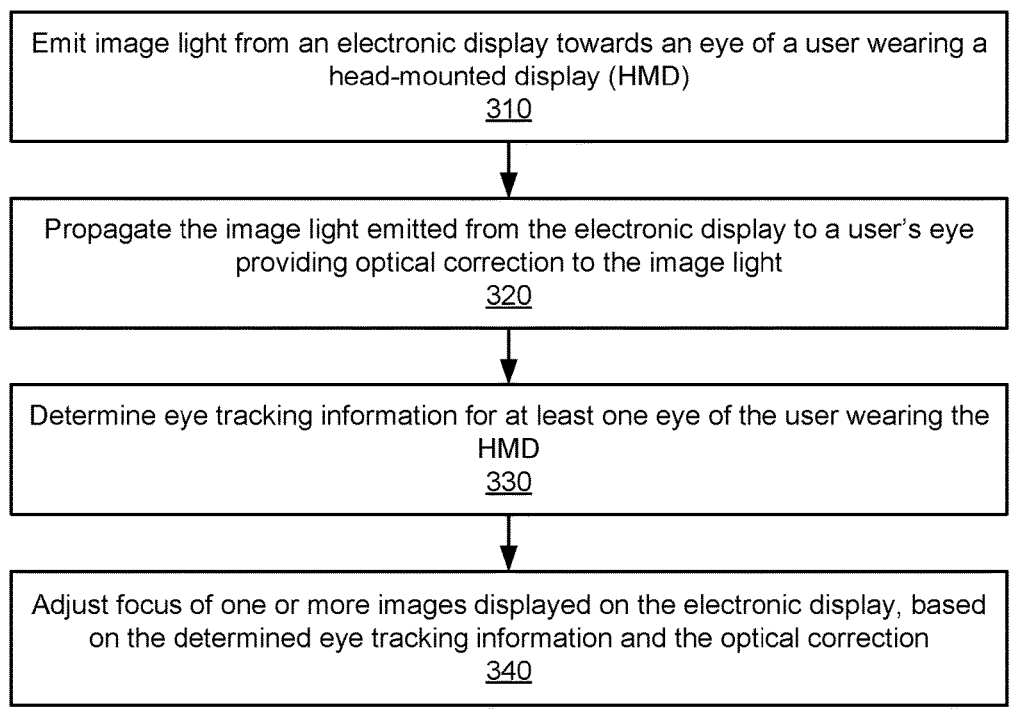
FIG. 3 is a flow chart illustrating a process of adjusting focus of image light, which may be implemented at the HMD shown in FIG. 1, in accordance with an embodiment.

FIG. 3 is a flow chart illustrating a process 300 of adjusting focus of content presented to a user, which may be implemented at the HMD 100 shown in FIG. 1, in accordance with an embodiment. The process 300 of FIG. 3 may be performed by the components of a HMD (e.g., the HMD 100). Other entities may perform some or all of the steps of the process in other embodiments. Likewise, embodiments may include different and/or additional steps, or perform the steps in different orders.

The HMD emits 310 image light (e.g., from an electronic display) towards an eye of a user wearing the HMD. In some embodiments, the user has an optical prescription, and the HMD provides optical correction to the image light based on the user's optical prescription.

The HMD propagates 320 (e.g., through components of an optical assembly) the image light emitted from the electronic display to a user's eye providing optical correction to the image light. In some embodiments, the optical assembly provides the optical correction to the image light based at least in part on an optical characteristic of at least one component of the optical assembly. The optical assembly comprises a back optical element configured to receive the image light directly from the electronic display. The optical assembly further includes a coupling assembly configured to couple a front optical element to a location within the optical assembly such that the front optical element receives light transmitted by the back optical element, and that there is an air gap between the location and the back optical element. In one or more embodiments, the optical correction of the optical assembly is determined in part by an optical characteristic of the front optical element. A varifocal module integrated into the HMD and coupled to optical elements of the optical assembly takes into account an optical power of the front optical element, and can correct an overall optical characteristic of the optical assembly for the user's optical prescription.

The HMD determines 330 (e.g., via an eye tracking system) eye tracking information for at least one eye of the user wearing the HMD. The determined eye tracking information may comprise information about a position and orientation of the user's eye in an eye-box, i.e., information about eye position and an angle of an eye-gaze. In an embodiment, the user's eye may be illuminated with a structured light. Then, the eye tracking system can use locations of reflected structured light in a captured image to determine eye position and eye-gaze. In another embodiment, the eye tracking system may determine eye position and eye-gaze based on magnitudes of image light captured over a plurality of time instants.

The HMD adjusts 340 (e.g., via the varifocal module) focus of one or more images displayed on the electronic display, based on the determined eye tracking information and the optical correction. In some embodiments, the varifocal module compensates for a difference between an optical prescription of the user wearing the HMD and the optical characteristic of the combined front and back optical elements to provide the optical correction to the image light. In one or more embodiment, the front optical element is configured as replaceable and it is selected to have an optical characteristic that is closest to the user's optical prescription, including a spherical optical power and astigmatism correction. Additionally, or alternatively, the front optical element is configured as rotatable to align the front optical element within the optical assembly to compensate for a residual astigmatism error. In one embodiment, the varifocal module adjusts focus of the one or more images displayed on the electronic display to adjust for the user's optical prescription by adjusting a focal distance of the optical assembly based on the determined eye tracking information and the optical correction. The focal distance of the optical assembly can be adjusted by moving the electronic display and/or optical elements along an optical axis, which also mitigates VAC of image light propagating towards a user's eye. In another embodiment, the varifocal module adjusts 340 focus of the one or more images displayed on the electronic display to adjust for the user's optical prescription in whole or in part. In yet another embodiment, the varifocal module adjusts 340 focus of the one or more images displayed on the electronic display and as coupled with the eye tracking information to facilitate performing foveated rendering of the one or more images. The HMD may perform (e.g., via the varifocal module or some other module) various other applications based at least in part on the determined eye tracking information. The applications include, but are not limited to, providing user interfaces (e.g., gaze-based selection), attention estimation (e.g., for user safety), different gaze-contingent display modes (e.g., synthetic depth of field rendering), metric scaling for depth and parallax correction (e.g., inter-pupillary distance (IPD) and eye-box adjustment), etc.

System Environment

Figure 4:
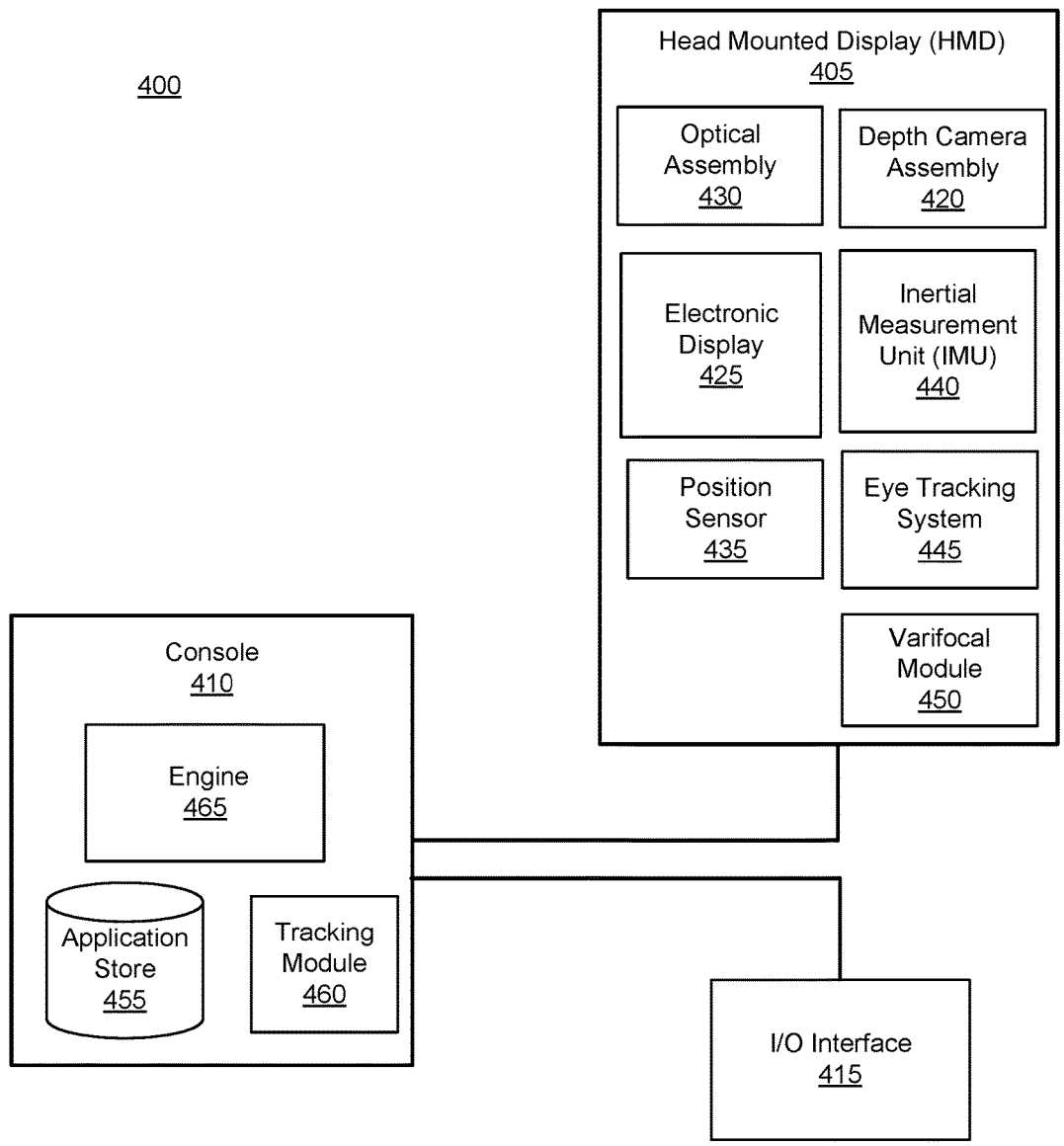
FIG. 4 is a block diagram of a system environment that includes the HMD shown in FIG. 1, in accordance with an embodiment.

FIG. 4 is a block diagram of one embodiment of a HMD system 400 in which a console 410 operates. The HMD system 400 may operate in a VR system environment, an AR system environment, a MR system environment, or some combination thereof. The HMD system 400 shown by FIG. 4 comprises an HMD 405 and an input/output (I/O) interface 415 that is coupled to the console 410. While FIG. 4 shows an example HMD system 400 including one HMD 405 and on I/O interface 415, in other embodiments any number of these components may be included in the HMD system 400. For example, there may be multiple HMDs 405 each having an associated I/O interface 415, with each HMD 405 and I/O interface 415 communicating with the console 410. In alternative configurations, different and/or additional components may be included in the HMD system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD 405 is a head-mounted display that presents content to a user comprising virtual and/or augmented views of a physical, real-world environment with computer-generated elements (e.g., 2D or 3D images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 405 is the HMD 100 described above in conjunction with FIG. 1.

The HMD 405 includes a DCA 420, an electronic display 425, an optical assembly 430, one or more position sensors 435, an IMU 440, an eye tracking system 445, and a varifocal module 450. In some embodiments, at least one of the eye-tracking system 445 and the varifocal module 450 may be integrated within the optical assembly 430, as described above in conjunction with FIG. 2. Some embodiments of the HMD 405 have different components than those described in conjunction with FIG. 4. Additionally, the functionality provided by various components described in conjunction with FIG. 4 may be differently distributed among the components of the HMD 405 in other embodiments.

The DCA 420 captures data describing depth information of an area surrounding the HMD 405. The data describing depth information may be associated with one or a combination of the following techniques used to determine depth information: structured light (SL), time-of-flight (ToF), or some combination thereof. The DCA 420 can compute the depth information using the data, or the DCA 420 can send this information to another device such as the console 410 that can determine the depth information using data from the DCA 420.

The DCA 420 includes an illumination source, an imaging device, and a controller. The illumination source emits light onto an area surrounding the HMD. The illumination source includes a plurality of emitters on a single substrate. The imaging device captures ambient light and light from one or more emitters of the plurality of emitters of the plurality of emitters that is reflected from objects in the area. The controller coordinates how the illumination source emits light and how the imaging device captures light. In some embodiments, the controller may also determine depth information associated with the local area using the captured images.

The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), a vertical-cavity surface-emitting laser (VCSEL), or some other source. In some embodiments, the plurality of emitters emits light having a structured light pattern.

The electronic display 425 displays 2D or 3D images to the user in accordance with data received from the console 410. In various embodiments, the electronic display 425 comprises a single electronic display or multiple electronic displays (e.g., a display for each eye of a user). Examples of the electronic display 425 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 430 magnifies image light received from the electronic display 425, corrects optical errors associated with the image light, and presents the corrected image light to a user of the HMD 405. In various embodiments, the optical assembly 430 is an embodiment of the optical assembly 220 described above in conjunction with FIG. 2. The optical assembly 430 includes a plurality of optical elements. Example optical elements included in the optical assembly 430 include: an aperture, a Fresnel lens, a convex lens, a concave lens, a filter, a reflecting surface, or any other suitable optical element that affects image light. Moreover, the optical assembly 430 may include combinations of different optical elements. In some embodiments, one or more of the optical elements in the optical assembly 430 may have one or more coatings, such as partially reflective or anti-reflective coatings.

Magnification and focusing of the image light by the optical assembly 430 allows the electronic display 425 to be physically smaller, weigh less and consume less power than larger displays. Additionally, magnification may increase the field of view of the content presented by the electronic display 425. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optical assembly 430 may be designed to correct one or more types of optical error. Examples of optical error include barrel or pincushion distortions, longitudinal chromatic aberrations, or transverse chromatic aberrations. Other types of optical errors may further include spherical aberrations, field curvature, astigmatism, or any other type of optical error. In some embodiments, content provided to the electronic display 425 for display is pre-distorted, and the optical assembly 430 corrects the distortion when it receives image light from the electronic display 425 generated based on the content.

In some embodiments, the optical assembly 430 is configured to provide optical correction to image light emitted from the electronic display 425 to an eye of a user wearing the HMD 405 such that the image light is emitted in a manner that is customized to a user's optical prescription.

The optical assembly 430 comprises a front optical element closest to the user's eye and a back optical element closest to the electronic display 425. The back optical element receives the image light directly from the electronic display 425, and the front optical element receives the image light transmitted by the back optical element. The optical correction provided by the optical assembly 430 is determined in part by an optical characteristic of the front optical element. The front optical element can be replaceable and selected from a set of optical elements, wherein each optical element from the set has a different optical characteristic.

The IMU 440 is an electronic device that generates data indicating a position of the HMD 405 based on measurement signals received from one or more of the position sensors 435 and from depth information received from the DCA 420. A position sensor 435 generates one or more measurement signals in response to motion of the HMD 405. Examples of position sensors 435 include: one or more accelerometers, one or more gyroscopes, one or more magnetometers, another suitable type of sensor that detects motion, a type of sensor used for error correction of the IMU 440, or some combination thereof. The position sensors 435 may be located external to the IMU 440, internal to the IMU 440, or some combination thereof.

Based on the one or more measurement signals from one or more position sensors 435, the IMU 440 generates data indicating an estimated current position of the HMD 405 relative to an initial position of the HMD 405. For example, the position sensors 435 include multiple accelerometers to measure translational motion (forward/back, up/down, left/right) and multiple gyroscopes to measure rotational motion (e.g., pitch, yaw, roll). In some embodiments, the IMU 440 rapidly samples the measurement signals and calculates the estimated current position of the HMD 405 from the sampled data. For example, the IMU 440 integrates the measurement signals received from the accelerometers over time to estimate a velocity vector and integrates the velocity vector over time to determine an estimated current position of a reference point on the HMD 405. Alternatively, the IMU 440 provides the sampled measurement signals to the console 410, which interprets the data to reduce error. The reference point is a point that may be used to describe the position of the HMD 405. The reference point may generally be defined as a point in space or a position related to the HMD's 405 orientation and position.

The IMU 440 receives one or more parameters from the console 410. The one or more parameters are used to maintain tracking of the HMD 405. Based on a received parameter, the IMU 440 may adjust one or more IMU parameters (e.g., sample rate). In some embodiments, certain parameters cause the IMU 440 to update an initial position of the reference point so it corresponds to a next position of the reference point. Updating the initial position of the reference point as the next calibrated position of the reference point helps reduce accumulated error associated with the current position estimated the IMU 440. The accumulated error, also referred to as drift error, causes the estimated position of the reference point to "drift" away from the actual position of the reference point over time. In some embodiments of the HMD 405, the IMU 440 may be a dedicated hardware component. In other embodiments, the IMU 440 may be a software component implemented in one or more processors.

The eye tracking system 445 determines eye tracking information associated with an eye of a user wearing the HMD 405. The eye tracking information determined by the eye tracking system 445 may comprise information about a position and orientation of the user's eye, i.e., information about eye position and an angle of an eye-gaze. The eye tracking system 445 is an embodiment of the eye-tracking system 225 described above in conjunction with FIG. 2 that includes the illumination source 265, the imaging device 270 and the controller 275. In some embodiments, the eye tracking system 445 is integrated into the optical assembly 430. The eye-tracking system 445 may comprise an illumination source, an imaging device and a controller integrated, at least optically, within an air gap between a pair of optical elements of the optical assembly 430.

In some embodiments, the varifocal module 450 is integrated into the HMD 405. An embodiment of the varifocal module 450 is the varifocal module 280 described above in conjunction with FIG. 2. The varifocal module 450 can be coupled to the eye tracking system 445 to obtain eye tracking information determined by the eye tracking system 445. The varifocal module 450 is configured to adjust focus of one or more images displayed on the electronic display 425, based at least in part on the determined eye tracking information obtained from the eye tracking system 445. The varifocal module 450 can also be configured to compensate for a difference between an optical prescription of the user wearing the HMD 405 and the optical characteristic of the front optical element of the optical assembly 430 to provide the optical correction to the image light emitted from the electronic display 425 towards the user's eye. The varifocal module 450 can also prompt the user to replace the front optical element, if the front optical element being used within the optical assembly 430 does not provide enough optical power in view of varifocal capability of the HMD system 400 to correct for the user's optical prescription. In an embodiment, the varifocal module 450 can be configured in this case to suggest a correct front optical element to use.

The varifocal module 450 can be interfaced (e.g., either mechanically or electrically) with at least one of the electronic display 425, the front optical element of the optical assembly 430, and the back optical element of the optical assembly 430. Then, the varifocal module 450 adjusts focus of the one or more images displayed on the electronic display 425 by adjusting position of at least one of the electronic display 425, the front optical element of the optical assembly and the back optical element of the optical assembly 430, based on the determined eye tracking information obtained from the eye tracking system 445 and the optical correction. By adjusting position of the at least one of the electronic display 425 and at least one optical element of the optical assembly 430, the varifocal module 450 varies focus of image light output from the electronic display 425 towards the user's eye.

The varifocal module 450 may be also configured to adjust resolution of the images displayed on the electronic display 425 by performing foveated rendering of the displayed images, based at least in part on the determined eye tracking information obtained from the eye tracking system 445. In this case, the varifocal module 450 provides appropriate image signals to the electronic display 425. The varifocal module 450 provides image signals with a maximum pixel density for the electronic display 425 only in a foveal region of the user's eye-gaze, while providing image signals with lower pixel densities in other regions of the electronic display 425.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440 that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 405 for processing in accordance with information received from one or more of: the DCA 420, the HMD 405, and the I/O interface 415. In the example shown in FIG. 4, the console 410 includes an application store 455, a tracking module 460, and an engine 465. Some embodiments of the console 410 have different modules or components than those described in conjunction with FIG. 4. Similarly, the functions further described below may be distributed among components of the console 410 in a different manner than described in conjunction with FIG. 4.

The application store 455 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 460 calibrates the system environment 400 using one or more calibration parameters and may adjust one or more calibration parameters to reduce error in determination of the position of the HMD 405 or of the I/O interface 415. For example, the tracking module 460 communicates a calibration parameter to the DCA 420 to adjust the focus of the DCA 420 to more accurately determine positions of SL elements captured by the DCA 420. Calibration performed by the tracking module 460 also accounts for information received from the IMU 440 in the HMD 405 and/or an IMU 440 included in the I/O interface 415. Additionally, if tracking of the HMD 405 is lost (e.g., the DCA 420 loses line of sight of at least a threshold number of SL elements), the tracking module 460 may re-calibrate some or all of the system environment 400.

The tracking module 460 tracks movements of the HMD 405 or of the I/O interface 415 using information from the DCA 420, the one or more position sensors 435, the IMU 440 or some combination thereof. For example, the tracking module 460 determines a position of a reference point of the HMD 405 in a mapping of a local area based on information from the HMD 405. The tracking module 460 may also determine positions of the reference point of the HMD 405 or a reference point of the I/O interface 415 using data indicating a position of the HMD 405 from the IMU 440 or using data indicating a position of the I/O interface 415 from an IMU 440 included in the I/O interface 415, respectively. Additionally, in some embodiments, the tracking module 460 may use portions of data indicating a position or the HMD 405 from the IMU 440 as well as representations of the local area from the DCA 420 to predict a future location of the HMD 405. The tracking module 460 provides the estimated or predicted future position of the HMD 405 or the I/O interface 415 to the engine 465.

The engine 465 generates a 3D mapping of the area surrounding the HMD 405 (i.e., the "local area") based on information received from the HMD 405. In some embodiments, the engine 465 determines depth information for the 3D mapping of the local area based on information received from the DCA 420 that is relevant for techniques used in computing depth. The engine 465 may calculate depth information using one or more techniques in computing depth (e.g., SL, ToF, or some combination thereof). In various embodiments, the engine 465 uses different types of information determined by the DCA 420 or a combination of types of information determined by the DCA 420.

The engine 465 also executes applications within the system environment 400 and receives position information, acceleration information, velocity information, predicted future positions, or some combination thereof, of the HMD 405 from the tracking module 460. Based on the received information, the engine 465 determines content to provide to the HMD 405 for presentation to the user. For example, if the received information indicates that the user has looked to the left, the engine 465 generates content for the HMD 405 that mirrors the user's movement in a virtual environment or in an environment augmenting the local area with additional content. Additionally, the engine 465 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

The engine 465 can be configured to utilize, in association with the console 410 and the HMD 405, the eye tracking information obtained from the eye tracking system 445 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking system 445, the engine 465 determines resolution of the content provided to the HMD 405 for presentation to the user on the electronic display 425. The engine 465 provides the content to the HMD 405 having a maximum pixel density (maximum resolution) on the electronic display 425 in a foveal region of the user's gaze, whereas the engine 465 provides a lower pixel resolution in other regions of the electronic display 425, thus achieving less power consumption at the HMD 405 and saving computing cycles of the console 410 without compromising a visual experience of the user. In some embodiments, the engine 465 can be configured to optimize the performance of viewing optics of the HMD 405 (e.g., components of the optical assembly 430), based on the eye tracking information obtained from the eye tracking system 445. In one embodiment, the engine 465 can adjust optical distortion correction parameters of the components of the optical assembly 430, e.g., to prevent vergence-accommodation conflict. In an alternate embodiment, the engine 465 can adjust focus of images displayed on the electronic display 425, e.g., to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracker comprising:
   an illumination source located between a first optical element and a second optical element which share an optical axis, the eye tracker configured to:
   output light generated by the illumination source, and
   determine a gaze direction for an eye relative to the optical axis based at least in part on a modified version of the output light,
   the output light being modified by an optical power of the first optical element prior to reflection from the eye.

2. The eye tracker of claim 1, wherein the first optical element is replaceable and selected from a set of optical elements, each optical element from the set having a unique optical power.

3. The eye tracker of claim 2, wherein the set of optical elements comprises spherical lenses with spherical optical powers of −6, −3, 0, and +3 diopters, and other lenses with the same spherical optical powers having additional diopters for astigmatism.

4. The eye tracker of claim 1, wherein the first optical element is rotatable to compensate for astigmatism.

5. The eye tracker of claim 1, wherein the eye tracker is positioned optically after reflection from the second optical element.

6. The eye tracker of claim 1, wherein the eye tracker is positioned optically folded between the first optical element and the second optical element.

7. The eye tracker of claim 1, wherein a surface of the second optical element is configured to reflect light of a defined range of wavelengths, and the eye tracker comprises:
   the illumination source positioned optically between the first optical element and the second optical element, the illumination source configured to illuminate the surface of the back optical element with the output light having one or more wavelengths within the defined range of wavelengths;
   an imaging device positioned optically between the first optical element and the second optical element, the imaging device configured to capture an image of the eye illuminated with the modified version of the output light having the one or more wavelengths and reflected from the surface of the back optical element; and
   a controller coupled to the imaging device and the illumination source, the controller configured to determine the gaze direction for the eye based on the captured image.

8. The eye tracker of claim 7, wherein the surface of the second optical element is coated to reflect light of the defined range of wavelengths and transmit visible light.

9. The eye tracker of claim 7, wherein the surface of the second optical element is spherical, aspherical, consisting of a polynominal basis, or of a free-form.

10. The eye tracker of claim 7, wherein the imaging device is oriented to capture the image of the eye illuminated with the modified version of the output light reflected from the eye and then from the surface of the second optical element.

11. The eye tracker of claim 7, wherein:
   the modified version of the output light having the one or more wavelengths reflected from the surface of the second optical element comprises infra-red (IR) light; and
   the imaging device comprises a camera configured to capture images in the IR.

12. The eye tracker of claim 1, wherein the illumination source and an imaging device of the eye tracker are positioned outside of an optical path to the eye and at opposite sides of an optical axis.

13. The eye tracker of claim 1, wherein the first optical element shares an optical axis with the second optical element.

14. The eye tracker of claim 1, wherein the eye tracker, the first optical element and the second optical element are part of a head-mounted display (HMD).

15. The eye tracker of claim 14, wherein the HMD comprises: a display sharing an optical axis with the first optical element and the second optical element, the display being adjacent to the second optical element; and a varifocal module configured to adjust focus of one or more images displayed on the display, based on the determined gaze direction and the optical power.

16. The eye tracker of claim 15, wherein the varifocal module is configured to compensate for a difference between a prescription of a user of the HMD and the optical power to provide optical correction to image light emitted from the display.

17. The eye tracker of claim 15, wherein the varifocal module is configured to adjust focus of the one or more images displayed on the display by adjusting position of at least one of the display, the first optical element and the second optical element based on the determined gaze direction and the optical power.

18. The eye tracker of claim 14, wherein the HMD comprises:

a coupling assembly configured to couple the first optical element to a location within the HMD such that the first optical element receives light transmitted by the second optical element, and that there is an air gap between the location and the second optical element.

19. A method comprising:

instructing an illumination source located between a first optical element and a second optical element which share an optical axis to emit light, and determining a gaze direction for an eye relative to the optical axis based at least in part on a modified version of the emitted light, the emitted light being modified by an optical power of the first optical element prior to reflection from the eye.

20. The method of claim 19, wherein a surface of the second optical element is configured to reflect light of a defined range of wavelengths, the method further comprising:

instructing the illumination source to illuminate the surface of the second optical element with the emitted light having one or more wavelengths within the defined range of wavelengths;

capturing an image of the eye illuminated with the modified version of the emitted light having the one or more wavelengths and reflected from the surface of the second optical element; and determining the gaze direction for the eye based on the captured image.

* * * * *